Oct. 1, 1929. R. S. PIPER 1,730,240
VARIABLE REACTIVE COUPLING WINDING
Filed July 31, 1926  2 Sheets-Sheet 1

Inventor
Ralph S. Piper
Fred'k Transom
Attorney

Oct. 1, 1929.    R. S. PIPER    1,730,240
VARIABLE REACTIVE COUPLING WINDING
Filed July 31, 1926    2 Sheets-Sheet 2
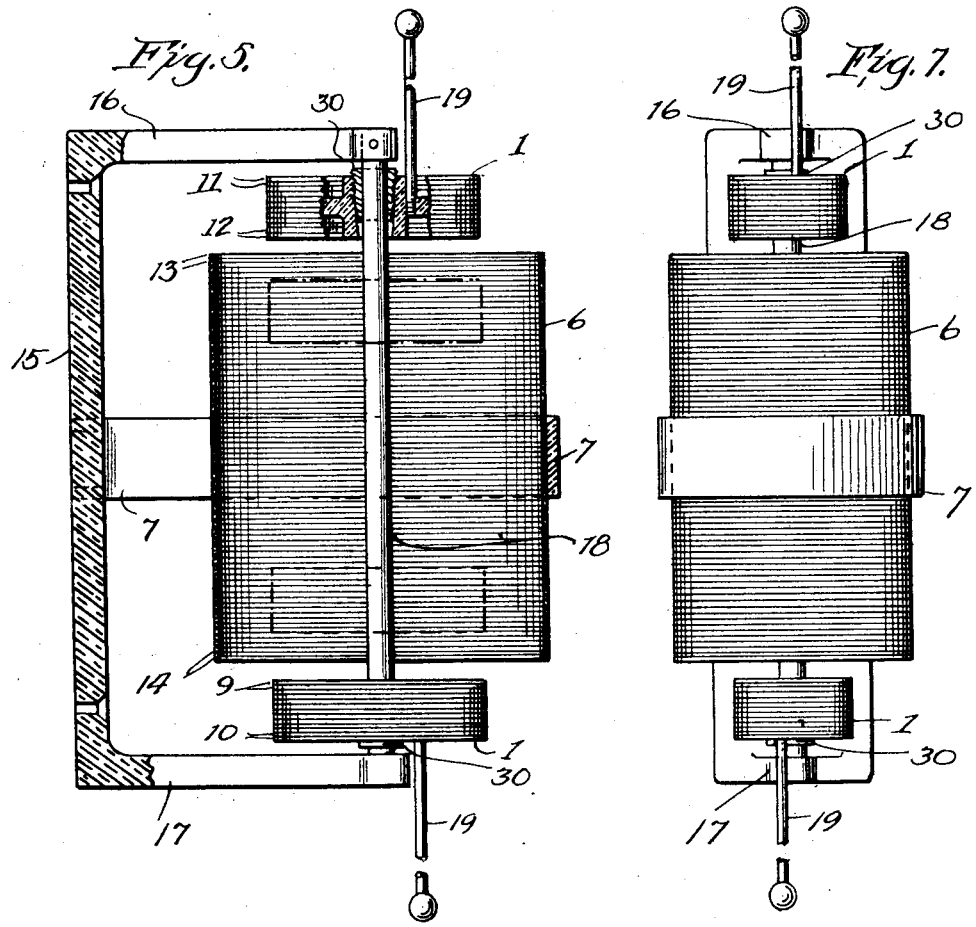
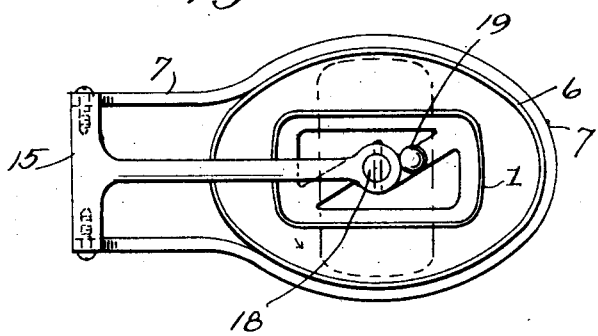

Patented Oct. 1, 1929

1,730,240

UNITED STATES PATENT OFFICE

RALPH S. PIPER, OF CHICAGO, ILLINOIS

VARIABLE REACTIVE COUPLING WINDING

Application filed July 31, 1926. Serial No. 126,273.

My invention relates to high frequency transformers and coupling coils, used especially in radio work but it is capable of a varied application in signal systems, registering devices, etc.

More particularly stated the invention applies to the windings and their relative dispositions with respect to each other when wound into coils, which permit a variable coupling characteristic to be introduced into the action of said coils, air-type transformers and other inductive reactive devices.

As instances of the use of my invention such devices will be found to be especially serviceable either as oscillatory coils per se, or as coupling coils between the several circuits useful in transmitting damped or undamped oscillatory currents, either to an antenna or its equivalents, or to the receiving elements of a radio-frequency receiving set, etc.

The present invention may be considered as presenting further improvements along the general lines laid down in my prior Patent 1,438,854, granted Dec. 12, 1922 and as stated generally above relates particularly to windings of certain shapes and their relations to each other to give a variable coupling characteristic, all as explained more in detail in connection with the accompanying drawings, which constitute part of this specification and in which:

Figure 5 shows partly in cross sectional elevation a further modification especially adapted to regulate both the capacity coupling and the magnetic coupling of a pair of coils;

Figure 6 shows in plan view a pair of coils designed to exhibit a similar type of coupling to that shown in Fig. 5;

Figure 7 is a front elevation of the coils shown in Figs. 5 and 6;

Figure 1:
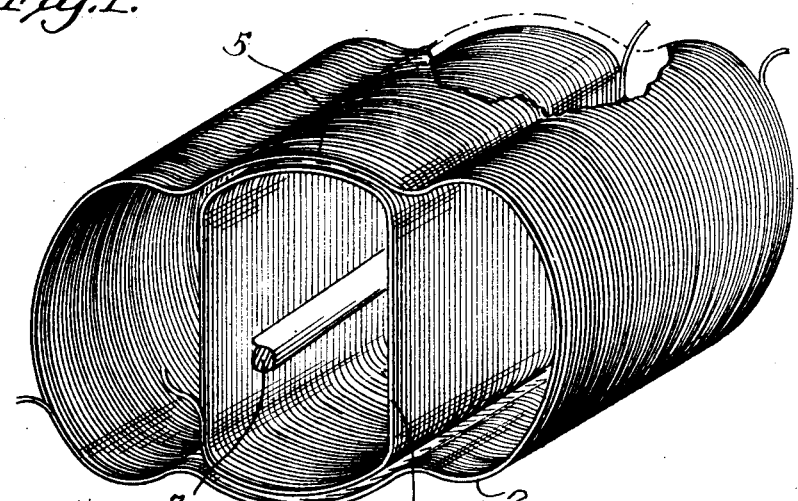
Figure 1 is a perspective view showing a pair of coils in close coupled relation.
Figure 2:
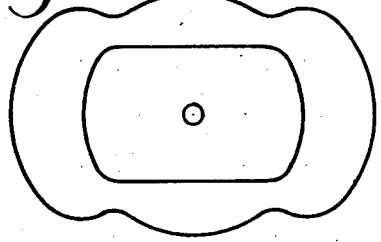
Figure 2 shows a similar pair of coils in open coupled relation.

Referring especially to Figures 1 and 2, two coils marked 1 and 2 are mounted generally symmetrically around an axis or shaft 3, on which the inner coil 1 may be revolubly carried; however this coil 1 could be fixed and the same results obtained by providing for angular rotation of coil 2.

The inner coil 1 is of the same general shape as the inside coil described in my Patent 1,438,854, that is, its windings approximate a parallelogram in contour but other polygonal forms may be used without departing from my invention.

The outer or envelope coil 2 is so wound that, while symmetrical with respect to shaft 3, it presents a pair of salient portions 4 and 5, which embrace the opposed smaller end turns of winding 1, either in fairly close coupled relationship, as shown in Fig. 1, or in a pronounced open coupled relationship as shown in Fig. 2, depending on whether the inner coil 1 is in the relative angular position with respect to coil 2 as shown in Fig. 1, or in a position at right angles thereto, as shown in Fig. 2. It will be apparent that between the extreme positions indicated in these two Figures 1 and 2, an intermediate degree of coupling exists between the coils 1 and 2, for instance, when coil 1 is turned 45 degrees from the position shown in Fig. 1, two of its corners will still be within the salients 4 and 5 of the outer winding 2, and while the coupling as a whole between the two coils 1 and 2 will be more open than as shown in Fig. 1, it will be closer on the average than as shown in Fig. 2.

The sections of envelope 2, constituting the salients 4 and 5, as shown in Fig. 1, are substantially concentric with the portions of the inner winding 1 opposed thereto. From this relation it is apparent that throughout the salient area the spacing of the two windings will be uniform, thus giving a uniform air gap in all angular positions of adjustment, varying in area, up to the angle at which the circular section of winding 1 begins to leave the salient area.

Figure 4:
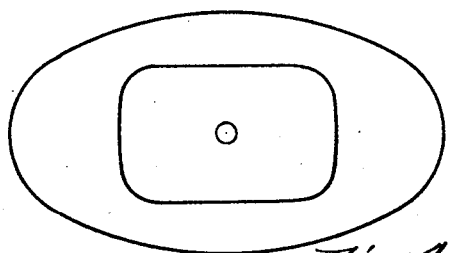
Figures 3 and 4 show a modification of the invention useful especially in radio frequency work.
Figure 3:
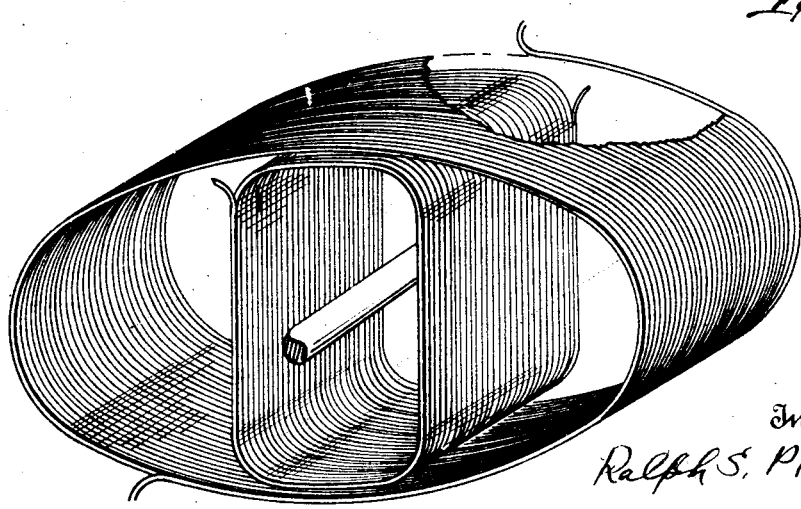

Figs. 3 and 4 show the same general characteristics of winding which exist in Figs. 1 and 2, but the magnetic linkage between the windings 1 and 2 has a constantly varying air gap from the minor axis of the winding 2 in either direction. Inasmuch as the winding 2 follows a smooth elliptical contour as the inner winding 1 is rotated from the close coupled position to an open coupled position, the change of coupling is made gradually and there will be no corner accentuation, or trailing field, to disturb the uniform adjustments so necessary in radio frequency control, both in transmitting station work and in receiving sets. This smoothness in operation can be further enhanced by proportioning the relative extents of the windings to bring about any desired graduation of air gap between the two, with relative change in position.

Figure 5 illustrates a form of the invention in which the outer, or envelope coil 2, is again given the shape of an ellipse, marked 6. This outer coil is supported by a Bakelite ring 7 surrounding its middle section, the ring being fastened to a base plate 15. The base plate is shown as further provided with a pair of end brackets 16 and 17 into which a Bakelite tube 18 is fixed. This tube is frictionally engaged by sleeves 30 on which the inner polygonal windings 1 are mounted. These sleeves are capable of a more or less tight engagement with tube 18, but are nevertheless freely adjustable thereon, slidably and rotatively, so that they can be placed in any desired position with respect to the outer coil. The placement of the coil 1 may be effected by means of push rods 19, which are fixed to the spider arms supporting the coils 1. Each of the coils carries two end terminals 9, 10—11, 12—13, 14 to permit of insertion in various types of circuits. Coils 1 are shown dotted in one position.

It will be seen that the assemblage of coils indicated in Fig. 5 gives a variable magnetic coupling and at the same time permits of a control of the capacity effects which always exists between conductors reacting on each other. When coils 1 are in their extreme end positions against the brackets 16 and 17 the capacity coupling between coils 1 and the outer coil 2 is very slight and yet a considerable magnetic coupling variation can be had in this position.

From the above explanations of the structures and results obtained by the several forms of my invention, it will be seen that each form of the invention retains the possibility of a most favorable automatic adjustment of the average field distribution to effect circuit resonant reactions, as explained in my prior patent, and gives the further possibility of a distinctly different set of irregular facets about which this self adjustment property can be exerted.

What I claim as my invention is:—

1. In an air core coupling transformer, a winding comprising turns of variable contour radii, defining salient surfaces, a companion winding designed to bridge said surfaces to effect different degrees of magnetic coupling therewith, and means for placing these windings in relatively different positions with respect to each other, around an axis at right angles to the plane of said turns.

2. In a coupling transformer, a rotor winding and an enveloping winding surrounding said rotor winding in varying spacing separation and mounting means for said windings permitting of various degrees of approach between adjacent faces of said windings while retaining them in the same winding plane.

3. In a radio coupler an envelope coil having symmetrical convolutions arranged in parallel planes with portions of said convolutions having a like radius of curvature and other portions having a varying radius of curvature in combination with an inner coil whose turns are in planes parallel to the turns of the envelope coil, and co-axial therewith, the said inner coil presenting symmetrically placed peripheral sections of enlarged diameter with respect to other portions of the coil, the said coils being relatively adjustable to each other angularly.

4. In a radio transformer a winding made up of symmetrically formed lobes and a co-operating winding approximating an oblate cylinder in shape, said windings being mounted to be relatively adjustable to each other in the same plane around a common axis.

5. In a radio frequency transformer a winding presenting opposed field faces and a co-operating winding also presenting opposed field faces, the turns of each winding being arranged in parallel planes and formed of a configuration designed to permit of said windings being placed in close coupled relation across their opposed faces, or in open coupled relation when angularly shifted from their close coupled position.

6. In a variable inductance transformer, primary and secondary windings having turns in parallel planes and presenting to each other concentric surfaces and excentric surfaces within a given range of angular adjustment, in combination with mounting means for placing said concentric surfaces in opposition to each other with a constant air gap spacing between them in a plane at right angles to the winding axis and for varying the area of said air gap.

RALPH S. PIPER.